(12) United States Patent
Herrmann

(10) Patent No.: US 11,718,234 B1
(45) Date of Patent: Aug. 8, 2023

(54) REAR VIEW SYSTEM FOR A VEHICLE

(71) Applicant: Motherson Innovations Company Limited, London (GB)

(72) Inventor: Andreas Herrmann, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 17/983,603

(22) Filed: Nov. 9, 2022

(30) Foreign Application Priority Data

Dec. 15, 2021 (DE) .......................... 102021133350.4

(51) Int. Cl.
  *B60R 1/25* (2022.01)
  *B60R 1/28* (2022.01)
  *B60R 1/06* (2006.01)

(52) U.S. Cl.
  CPC .............. *B60R 1/25* (2022.01); *B60R 1/0607* (2013.01); *B60R 1/28* (2022.01)

(58) Field of Classification Search
  CPC ............ B60R 1/25; B60R 1/0607; B60R 1/28
  See application file for complete search history.

(56) References Cited

FOREIGN PATENT DOCUMENTS

| DE | 10 2006 045 549 A1 | 4/2008 | |
|---|---|---|---|
| DE | 102006045549 A1 | 4/2008 | |
| DE | 10 2013 217 081 A1 | 3/2015 | |
| DE | 102013217081 A1 * | 3/2015 | ............... B60R 1/00 |
| DE | 102013217081 A1 | 3/2015 | |
| DE | 10 2018 116 836 | 1/2020 | |
| DE | 102018116836 A1 * | 1/2020 | ............. B60R 11/04 |

(Continued)

OTHER PUBLICATIONS

German Patent and Trademark Office, Office Action, Application 10 2021 133 350.4, dated Apr. 21, 2022.

(Continued)

*Primary Examiner* — Sath V Perungavoor
*Assistant Examiner* — Tyler B Edwards
(74) *Attorney, Agent, or Firm* — Jones Day

(57) ABSTRACT

The present disclosure refers to a rear view system for a vehicle, comprising a rear view device comprising at least one camera module and/or at least one reflective element, wherein the rear view device is configured to be mounted to the vehicle, in particular to a door or a body of the vehicle, in order to capture a field-of-view (FOV) in a scenery at least around a rear part of the vehicle and to be moved between at least two states relative to the door and/or the body of the vehicle, in particular between a folded and unfolded state, characterized by a time-of-flight (ToF) sensor for emitting at least one light signal, and a processing unit for determining at least one of the states of the rear view device when the rear view device is mounted to the vehicle, wherein the ToF sensor is configured to be mounted to the rear view device or to the vehicle separate from the rear view device, and wherein the processing unit is configured to operate the ToF sensor to emit the at least one light signal towards the FoV of the rear view device in case the ToF sensor is mounted to the rear view device or towards the rear view device in case the ToF sensor is mounted separate from the rear view device and to determine the at least one state of the rear view device based on the at least one light signal. It also refers to a vehicle with such a rear view system.

8 Claims, 12 Drawing Sheets

(56) References Cited

FOREIGN PATENT DOCUMENTS

| | | |
|---|---|---|
| DE | 102018116836 A1 | 1/2020 |
| EP | 3476654 A1 | 5/2019 |

OTHER PUBLICATIONS

German Patent and Trademark Office, Decision to Grant, Application 10 2021 133 350.4, dated Aug. 23, 2022.
German Patent and Trademark Office, Office Action for 10 2021 133 350.4, dated Apr. 21, 2021.

* cited by examiner

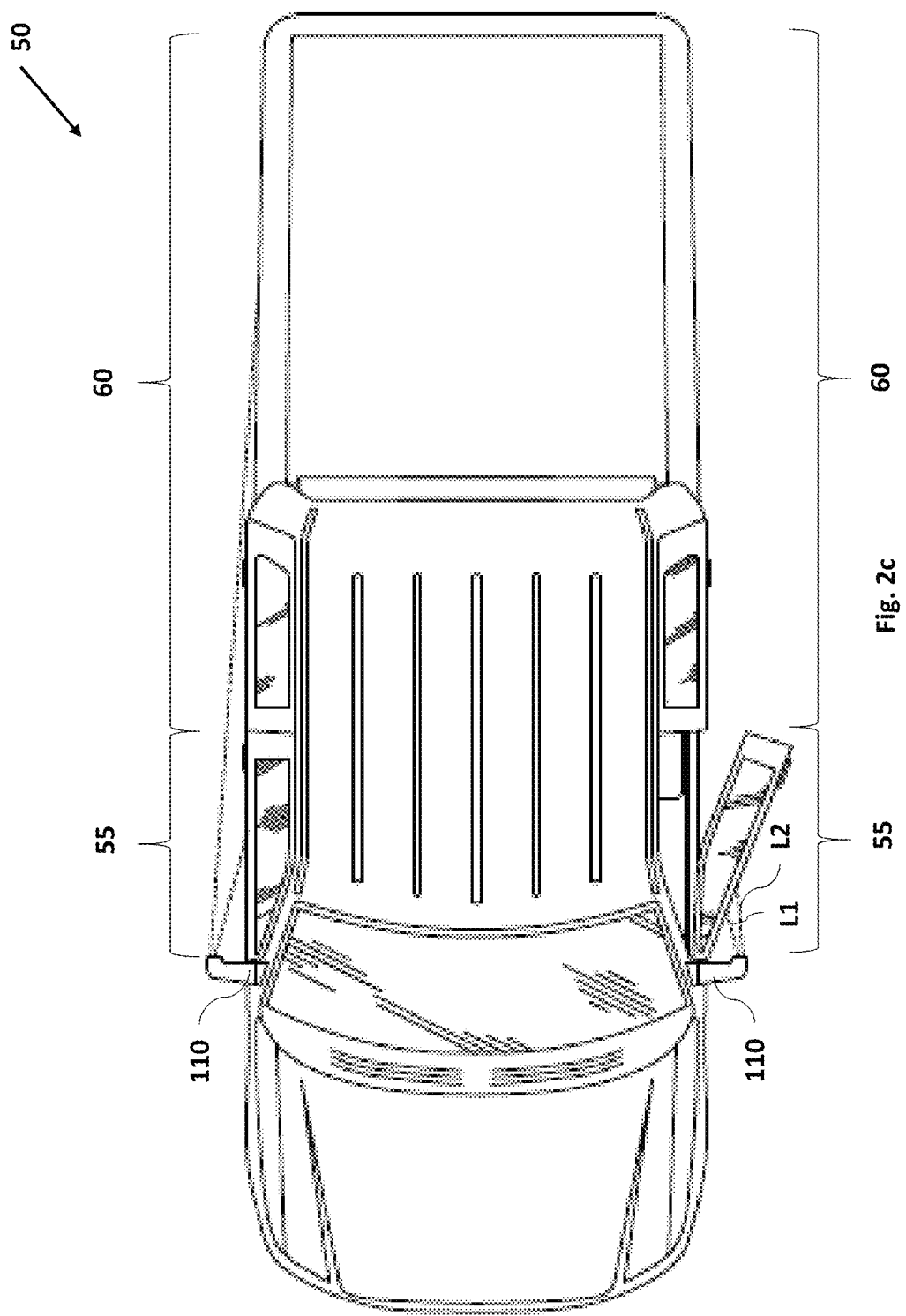

REAR VIEW SYSTEM FOR A VEHICLE

CROSS-REFERENCE TO RELATED APPLICATIONS

This application claims priority to German Patent Application No. DE 10 2021 133 350.4, filed on Dec. 15, 2021, the entirety of which is incorporated herein by reference.

FIELD

The present disclosure relates to tracking assemblies and more particularly to a time of flight (ToF) based tracking system to determine a state of rear view device of a vehicle. In detail, the present disclosure relates to a rear view system according to the pre-amble of claim 1. It also relates to a vehicle with such a rear view system.

BACKGROUND

The statements in this section merely provide background information related to the present disclosure and may not constitute prior art. Current tracking assemblies have difficulty in identifying a position or state of a rear view device. As such, the current tracking assemblies are incapable of accurately track and monitor the position or state of the rear view device. For example, EP 3 476 654 A1 discloses a mounting assembly for a rear view device with two elements, which can move relative to each other, wherein a first element is fixedly mounted to a vehicle and a second element has a camera mounted thereto, and wherein the relative position of the two elements to each other can be detected via signaling means. The mounting assembly known from EP 3 476 654 A1 has a complicated structure and does not allow a retrofitting to allow the determination of a position or state of the second element with the camera.

SUMMARY

It is an object of the present disclosure to further develop the known rear view assemblies to overcome the drawbacks of the prior art.

This object is solved with the features of the characterizing portion of claim 1. Preferred embodiments of the present disclosure are described in claims 2 to 8.

According to one aspect of the present disclosure, a rear view system for a vehicle comprises: a rear view device comprising at least one camera module and/or reflective element and a time-of-flight (ToF) sensor attached to one of a door and at least one portion of the body of the vehicle, wherein the camera module and/or reflective element is configured to capture a field-of-view (FOV) of the camera module and/or reflective element in a scenery at least around a rear part of the vehicle, and the ToF sensor is configured to emit at least one light signal towards the FOV; and a processing unit configured to: operate the ToF sensor to emit the at least one light signal, wherein the at least one signal includes the first light signal towards the door and a second light signal towards the at least one portion of the body of the vehicle in an event the rear view device is mounted on the door of the vehicle, and determine a state of the rear view device based on a time-of-flight of the at least one signal, wherein the state is one of an unfolded state and a folded state of the rear view device.

The term "rear view system" denotes the component arranged at the side of the vehicle at a position suitable to record at least the rear view from the vehicle. The position of the rear view system may be the same as for conventional vehicle mirror assemblies. Due to the possibility to display the recorded scenery inside the vehicle on a display, in an alternative, the rear view system may be arranged at a position outside the field of view of the driver of the vehicle. The rear view system comprises an arm or wing on which for example a camera is installed so that the camera is positioned via the wing at a distance to the chassis of the vehicle so that the chassis of the vehicle cannot restrict the field of view of the camera, or can only partially restrict the field of view of the camera.

The term "vehicle" denotes any motor driven vehicle driven be a driver, where the driver requires information about persons, other vehicles or objects in the near surrounding of the vehicle to be able to drive safety. As an example, motor vehicles are cars or trucks, especially when pulling trailers. The term "driving situation" denotes the direction, in which the vehicle is currently driven. The common driving situation is driving straight ahead, while cornering is a different driving situation. Other driving situations include reversing, parking, or turning. The latter can be a special form of cornering. Depending on the driving situation, the requirements for an illumination assembly change due to changing sceneries of interest to be observed by the driver via the rear view device.

The term "camera" denotes any device capable of recording or recognizing the environment of a vehicle and of displaying this recognized or recorded environment in an image so that a driver can process the environment as driving information based on the image display. The camera might be an infrared (IR) camera. IR cameras will increase the visibility of objects during nighttime. Especially CCD or CMOS cameras can detect near infrared (NIR) wavelengths not detectable by the human eye. The NIR denotes light with wavelengths within a spectral range between 700 nm and 1400 nm. NIR can rely on the sun's invisible infrared (IR) radiation during daytime operation. During nighttime operation, the NIR light may be provided by IR light sources of the illumination assembly illuminating the scenery in the field of view, where the reflected light is recorded by the camera. To be able to be used during nighttime, the camera must be sensitive at least to a part of the spectrum of the light emitted by the light sources of the illuminating assembly.

The term "field of view" denotes the extent of the observable world that is "seen" (recorded) at any given moment by the camera. The field of view relates to an angular field of view specified in degrees in vertical and horizontal direction. The recorded field of view can be displayed to the driver by rear view device on a corresponding display connected to the rear view device. In some embodiment the display might be part of the rear view device. The field of view is directed to the areas of interest for the driver to be able to drive the vehicle safety without endangering other persons, objects, or vehicles in the field of view, or damaging the own vehicle. The areas of interest might by the rear and side views of the vehicle, preferably on both sides of the vehicle as well as front views.

In an embodiment the processing unit is configured to generate a report of at least one event including a time-duration indicative of the state of the rear view system.

In yet another embodiment the processing unit is configured to determine the state of the door including an open-door position and a closed-door position. The state of the door is determined based on the time-of-flight of the at least one signal.

In a further embodiment, the processing unit determines the state of the rear view system or rather the rear device thereof, which comprises the camera, to be in the unfolded state in an event: the time-of-flight of the first light signal is within a first predefined time and a second predefined time, and the rear view system is mounted on the door of the vehicle.

The processing unit may determine the state of the rear view system to be in the folded state in an event: the time-of-flight of the first light signal is less than the first predefined time, and the rear view device is mounted on the door of the vehicle.

In yet another embodiment, the processing unit determines the state of the rear view system to be in the unfolded state in an event: the time-of-flight of the first light signal is within a first predefined time and a second predefined time, the time-of-flight of the second light signal is within a third predefined time and a fourth predefined time, and the rear view system is mounted on one of the door and at least one portion of body of the vehicle.

According to another aspect of the present disclosure, a rear view system for a vehicle comprises: a rear view device comprising at least one camera module and/or reflective element and a time-of-flight (ToF) sensor attached to one of a door and at least one portion of the body of the vehicle, wherein the camera module and/or reflective element is configured to capture a field-of-view (FOV) of the camera module and/or reflective element in a scenery at least around a rear part of the vehicle, and the ToF sensor is configured to emit a light signal; and a processing unit configured to: operate the ToF sensor to emit the light signal, wherein the signal includes a first light signal towards the door in an event the rear view device is mounted on the at least portion of the body of the vehicle, and determine a state of the rear view device based on a time-of-flight of the light signal, wherein the state is one of an unfolded state and a folded state of the rear view device.

According to a further aspect of the present disclosure, a rear view device comprises at least one camera module and/or reflective element, wherein the camera module and/or reflective element is configured to capture a field-of-view (FOV) of the camera module and/or reflective element in a scenery at least around a rear part of the vehicle; a time-of-flight (ToF) sensor attached to one of a door and at least one portion of the body of the vehicle the ToF sensor is configured to emit at least one light signal towards the FOV and the rear view device; and a processing unit configured to: operate the ToF sensor to emit the at least one light signal, wherein the at least one signal includes the first light signal towards the door and a second light signal towards the at least one portion of the body of the vehicle in an event the rear view device is mounted on the door of the vehicle, and determine a state of the rear view device based on a time-of-flight of the at least one light signal, wherein the state is one of an unfolded state and a folded state of the rear view device.

It should be noted that the features set out individually in the following description can be combined with each other in any technically advantageous manner and set out other forms of the present disclosure. The description further characterizes and specifies the present disclosure in particular in connection with the Figures.

BRIEF DESCRIPTION OF THE DRAWINGS

In order that the disclosure may be well understood, there will now be described various forms thereof, given by way of example, reference being made to the accompanying drawings, in which:

FIGS. 2a to 2d depict each the top of a vehicle with a rear view device of the rear view system being attached to the vehicle body and a ToF sensor being mounted to the rear view device, in different relative configurations of the rear view device and the vehicle door;

Figure 1A:
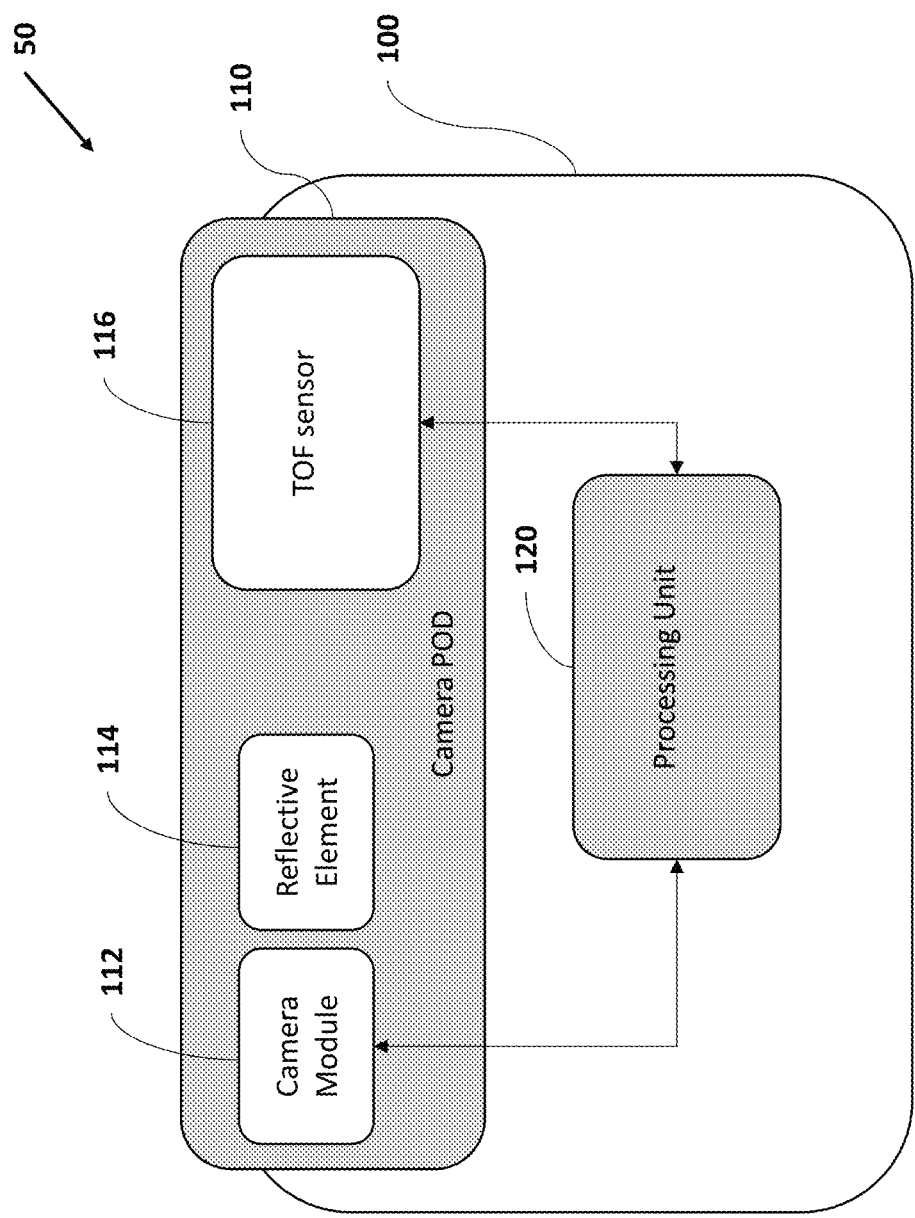
FIGS. 1a and 1b depict each a schematic view of a rear view system for a vehicle, with a ToF sensor being mounted to a rear view device and to the vehicle, respectively.

Drawings referred to in this description are not to be understood as being drawn to scale except if specifically noted, and such drawings are only exemplary in nature.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1a depicts a schematic view of a rear view system 100 for a vehicle 50. The rear view system 100 comprises a rear view device 110 and a processing unit 120.

The rear view device 110 is adapted to be attached to the vehicle 50 and comprises one or more camera module 112 and/or one or more reflective element 114. In the shown embodiment, the rear view device 110 is provided in form of a camera pod with a camera module 112 and, optionally, also a reflective element 114. Further, the rear view device 110 comprises a time-of-flight (ToF) sensor 116 which may be attached to one of a door 55 and at least one portion of the body 60 of the vehicle 50, as shown in FIGS. 2a to 2h. The camera module 112 and/or the reflective element 114 is configured to capture a field-of-view (FOV) in a scenery at least around a rear part of the vehicle 50. The ToF sensor 116 is configured to emit at least one light signal towards the FOV.

The processing unit 120 is configured to operate the ToF sensor 116 to emit the at least one light signal as and when required by the system 100. The ToF sensor 116 emits the at least one signal comprising
   a first light signal towards the door 55 of the vehicle 50 and
   a second light signal towards the at least one portion of the body 60 of the vehicle 50 in an event the rear view system 100 is mounted on the door 55 of the vehicle 50.

Further, the processing unit 120 is configured to determine a state of the rear view device 110 based on a time-of-flight of the at least one signal, the state being one of an unfolded state and a folded state of the rear view device 110. Still further, the processing unit 120 is configured to generate a report of at least one event including a time-duration indicative of the state of the rear view device 110. The system 100 through the processing unit 120 is configured to determine the state of the door 55 including an open-door state and a folded-door state. The state of the door is determined based on the time-of-flight of the at least one signal.

The processing unit 120 determines the state of the rear view system 100 to be in the unfolded state in an event the time-of-flight of the first light signal is within a first predefined time T1 and a second predefined time T2 and when the rear view system 100 is mounted on the door 55 of the vehicle 50. Further, the processing unit 120 determines the state of the rear view system 100 to be in the folded state in an event the time-of-flight of the first light signal is less than the first predefined time T1 and when the rear view system 100 is mounted on the door of the vehicle 50.

Furthermore, the processing unit 120 determines the state of the rear view device 110 to be in the unfolded state in an event the time-of-flight of the first light signal is within a first predefined time T1 and a second predefined time T2, and the time-of-flight of the second light signal is within a third predefined time T3 and a fourth predefined time T4, and when the rear view system 100 is mounted on one of the door and at least one portion of body of the vehicle 50.

Figure 1B:
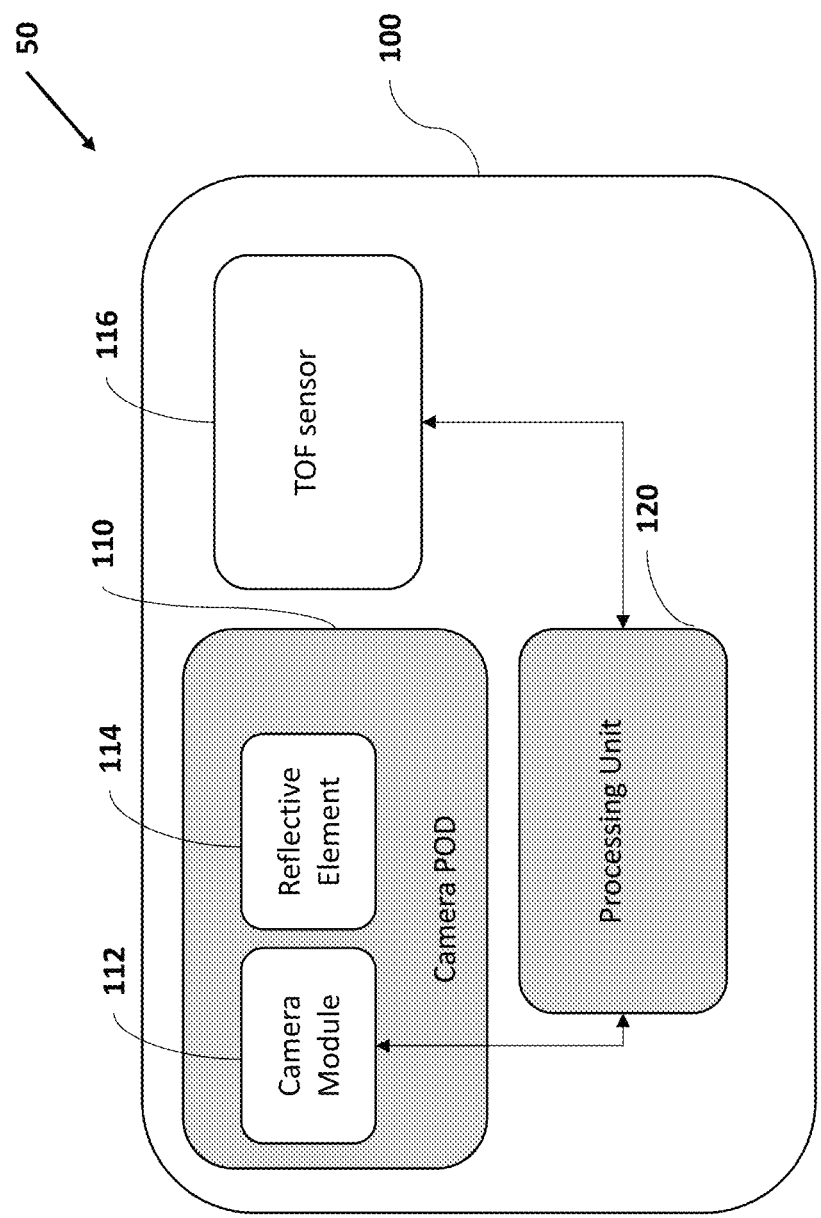

Further, as illustrated in FIG. 1b, in a different embodiment scenario the ToF sensor 116 can be located outside the rear view device 110 in order to emit light signals to at least one of the body 60 of the vehicle 50 and rear view device 110 mounted to the vehicle 50. The ToF sensor 116 may be attached to the base of the vehicle or into a fender of the vehicle 50 and may be integrated into an indicator light assembly of the vehicle.

FIGS. 2a to 2h depict various top views of the vehicle 50 with a rear view device 110 of FIG. 1a attached to the vehicle 50. In particular, in the embodiment shown in FIGS. 2a to 2d, the rear view device 110 is attached to the body 60 of the vehicle 50, while in the other embodiment shown in FIGS. 2e to 2h, the rear view device 110 is attached to the door 55 of the vehicle 50. For each of the two embodiments four different positions of the rear view device 110 relative to the door 55 and/or the body 60 are illustrated, with each configuration allowing a determination of whether the rear view device 110 is in its folded or unfolded state. Further, in both embodiments the ToF sensor 16 is mounted to the rear view device 110.

The rear view device 110 comprises one or more camera module 112 and/or one or more reflective element 114 and a ToF sensor 116. The rear view device 110 is attached to a portion of the body 60 of the vehicle 50 and ideally before the door 55. The camera module 112 and/or reflective element 114 is configured to capture a field-of-view FOV of the camera module 112 and/or the reflective element 114 in a scenery at least around a rear part of the vehicle 50. The ToF sensor 116 is configured to emit at least one light signal towards the FOV. The light signal comprises two light beams including a first light signal L1 and a second light signal L2. The angles of the at least one light signal may be pre-calibrated to determine at which angle of the first light signal L1 and the second light signal L2, the door 55 starts and ends and also when the body 60 starts and ends.

Figure 2A:
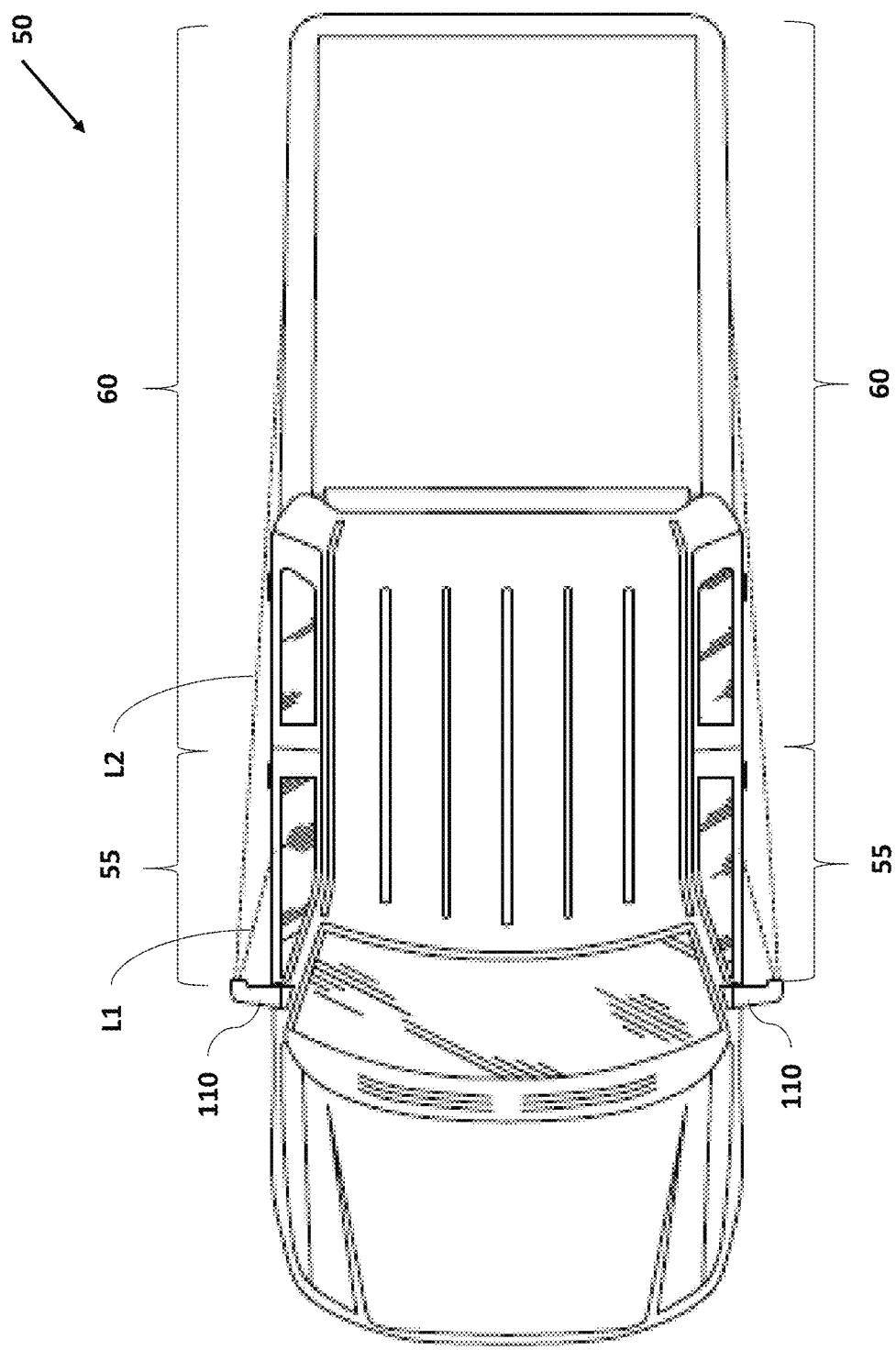

In an embodiment, as illustrated in FIG. 2a, the first light signal L1 is pointed towards the door 55 of the vehicle 50, while the second light signal L2 is pointed towards the rear end of the body 60 post the door 55. Both the light signals L1 and L2, correspondingly, return to the rear view device 110 within a predetermined duration-of-flight or time-of-flight as calibrate for the unfolded state of the rear view device 110 to determine that the state of the rear view device 110 is in an unfolded state, the rear view device 110 being attached to the at least one portion of the body 60 of the vehicle 50. More particularly, if the time-of-flight of the first light signal L1 is within a first predefined time T1 and a second predefined time T2, and the time-of-flight of the second light signal L2 is within a third predefined time T3 and a fourth predefined time T4, the state of the rear view device 110 corresponds to the unfolded state. The first predefined time T1 and a second predefined time T2 are the time-of-flights of the first light signal L1 to travel back from the door 55, i.e. with a door start portion and a door end portion, when the rear view device 110 is in the unfolded state. The third predefined time T3 and the fourth predefined time T4 are the time-of-flights of the second light signal L2 to travel back from the body 60, i.e. with a the body start portion and a body end portion, when the rear view device 110 is in the unfolded state.

Figure 2B:
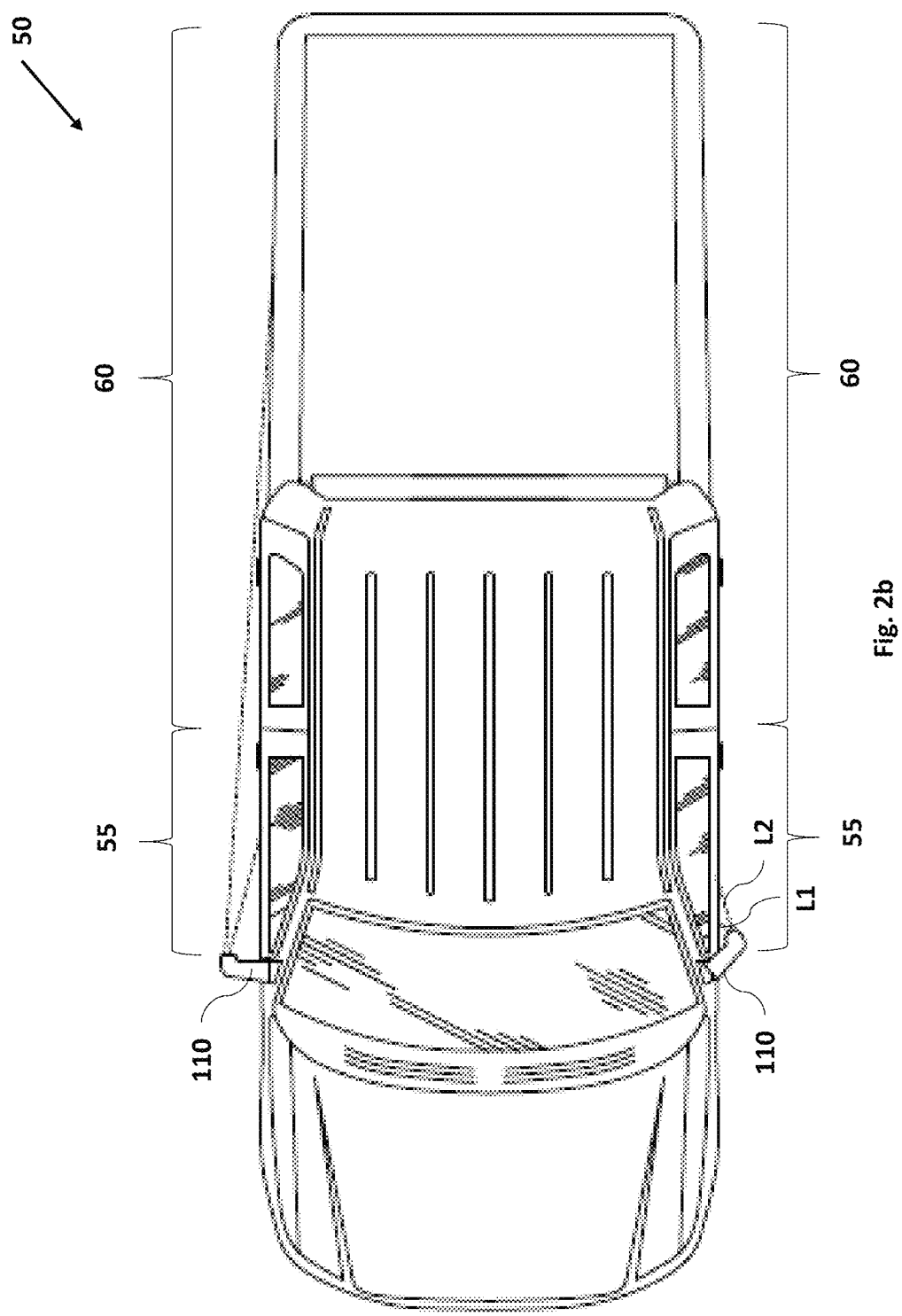

As illustrated in FIG. 2b, the first light signal L1 and the second light signal L2 on the left side of the vehicle 50 in driving direction are pointed towards the door 55 of the vehicle 50. Both the light signals L1 and L2, correspondingly, return to the rear view device 110 within a predetermined duration-of-flight or time-of-flight as calibrate for a folded state of the rear view device 110 to determine that the state of the rear view device 110 is in the folded state, with the rear view device 110 being attached to the at least one portion of the body 60 of the vehicle 50. More particularly, if the time-of-flight of the first light signal L1 is within a fifth predefined time T5 and the sixth predefined time T6, and the time-of-flight of the second light signal L2 is within a seventh predefined time T7 and an eighth predefined time T8, the rear view device 110 is in the folded state. The fifth predefined time T5 and the sixth predefined time T6 are the time-of-flights of the first light signal L1 to travel back from the door 5, i.e. door start portion and door end portion, when the rear view device 110 is in the folded state. The seventh predefined time T7 and the eighth predefined time T8 are the time-of-flights of the second light signal L2 to travel back from door 55 i.e. the door start portion and the door end portion when the rear view device 110 is in the folded state.

As illustrated in FIG. 2c, the first light signal L1 and the second light signal L2 on the left side of the vehicle 50 in driving direction are pointed towards the door 55 of the vehicle 50 and the door 50 is in an open position. Both the light signals L1 and L2 return to the rear view device 110 within a predetermined duration-of-flight or time-of-flight which is longer than the duration calibrated for a folded state of the rear view device 110 to determine that the state of the rear view device 110 is in the unfolded state, with the rear view device 110 being attached to the at least one portion of the body 60 of the vehicle 50. More particularly, the time-of-flight of the first light signal L1 takes longer than the fifth predefined time T5 and the sixth predefined time T6, while the time-of-flight of the second light signal L2 takes longer than the seventh predefined time T7 and the eighth predefined time T8, determining that the rear view device 110 is in the unfolded state. The fifth predefined time T5 and the sixth predefined time T6 are the time-of-flights of the first light signal L1 to travel back from the door 55, i.e. with a door start portion and a door end portion when the rear view device 110 is in the folded state. The seventh predefined time T7 and the eighth predefined time T8 are the time-of-flights of the second light signal L2 to travel back from door 55, i.e. with the door start portion and the door end portion when the rear view device 110 is in the folded state. The system 100 further determines that either the door 55 is open or there is an obstacle in an event the corresponding time-of-flight of the first light signal L1 and the second light signal L2 is in-between the pre-calibrated/determined time-of-flight for folded and unfolded states of the rear view device 110.

Figure 2D:
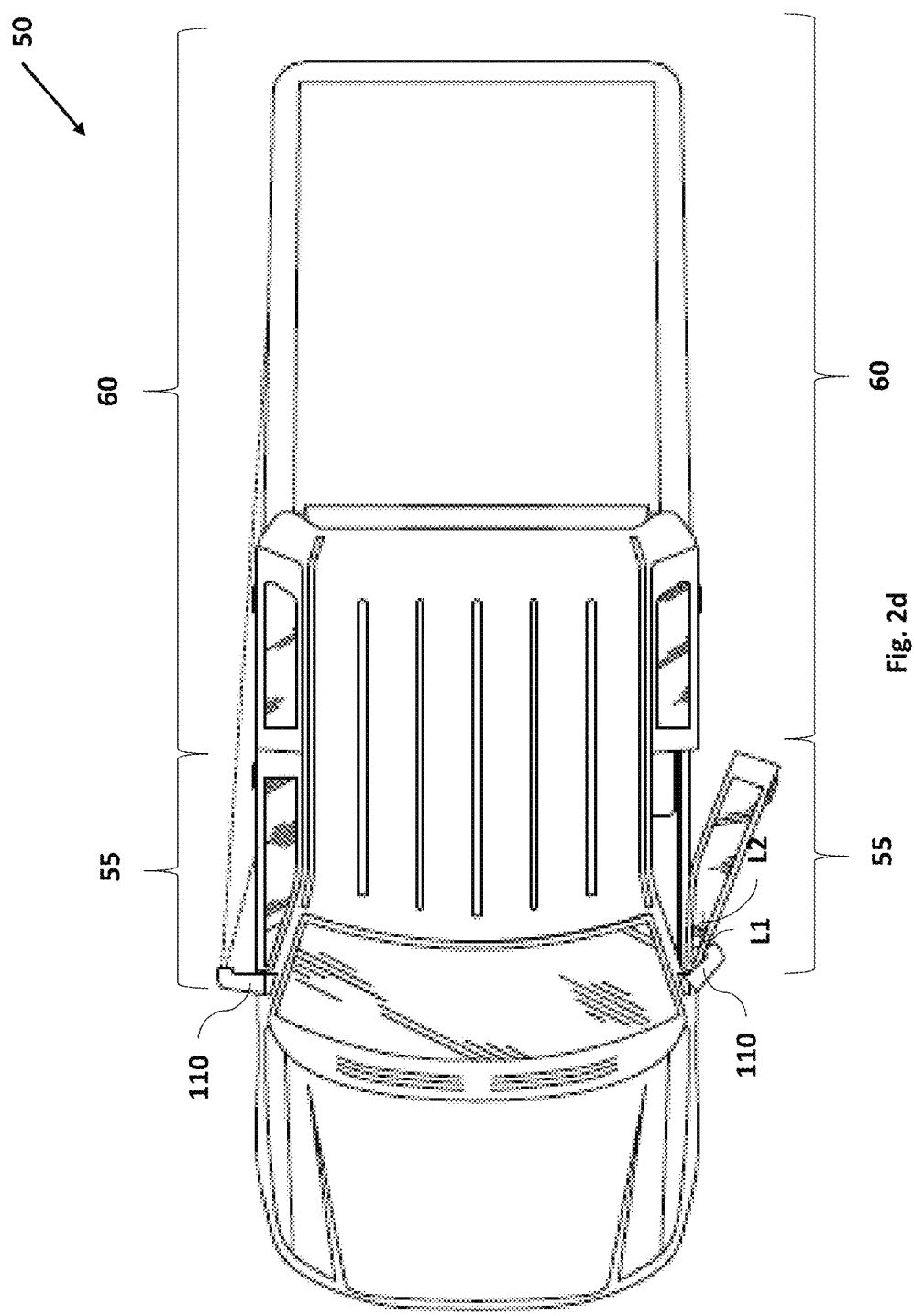

As illustrated in FIG. 2d, the first light signal L1 and the second light signal L2 on the left side of the vehicle 50 in driving direction are pointed towards the door 55 of the vehicle 50 and the door 50 is in an open position. Both the light signals L1 and L2, return to the rear view device 110 within a predetermined duration-of-flight or time-of-flight which is less than the duration that is calibrated for a folded state of the rear view device 110 to determine that the state of the rear view device 110 is in the folded state, with the rear view device 110 being attached to the at least one portion of the body 60 of the vehicle 50. More particularly, the time-of-flight of the first light signal L1 is less than the fifth predefined time T5 and the sixth predefined time T6, while the time-of-flight of the second light signal L2 is less than the seventh predefined time T7 and the eighth predefined time T8, determining that the rear view device 110 is in the folded state. The fifth predefined time T5 and the sixth predefined time T6 are the time-of-flights of the first light signal L1 to travel back from the door 55, i.e. with a door start portion and a door end portion when the rear view device 110 is in the folded state. The seventh predefined time T7 and the eighth predefined time T8 are the time-of-flights of the second light signal L2 to travel back from door 55, i.e. with a door start portion and a door end portion when the rear view device 110 is in the folded state. The system 100 further determines that either the door 55 is open or there is an obstacle in an event that the corresponding time-of-flight of the first light signal L1 and the second light signal L2 is less than the pre-calibrated/determined time-of-flight for folded state of the rear view device 110.

Figure 2E:
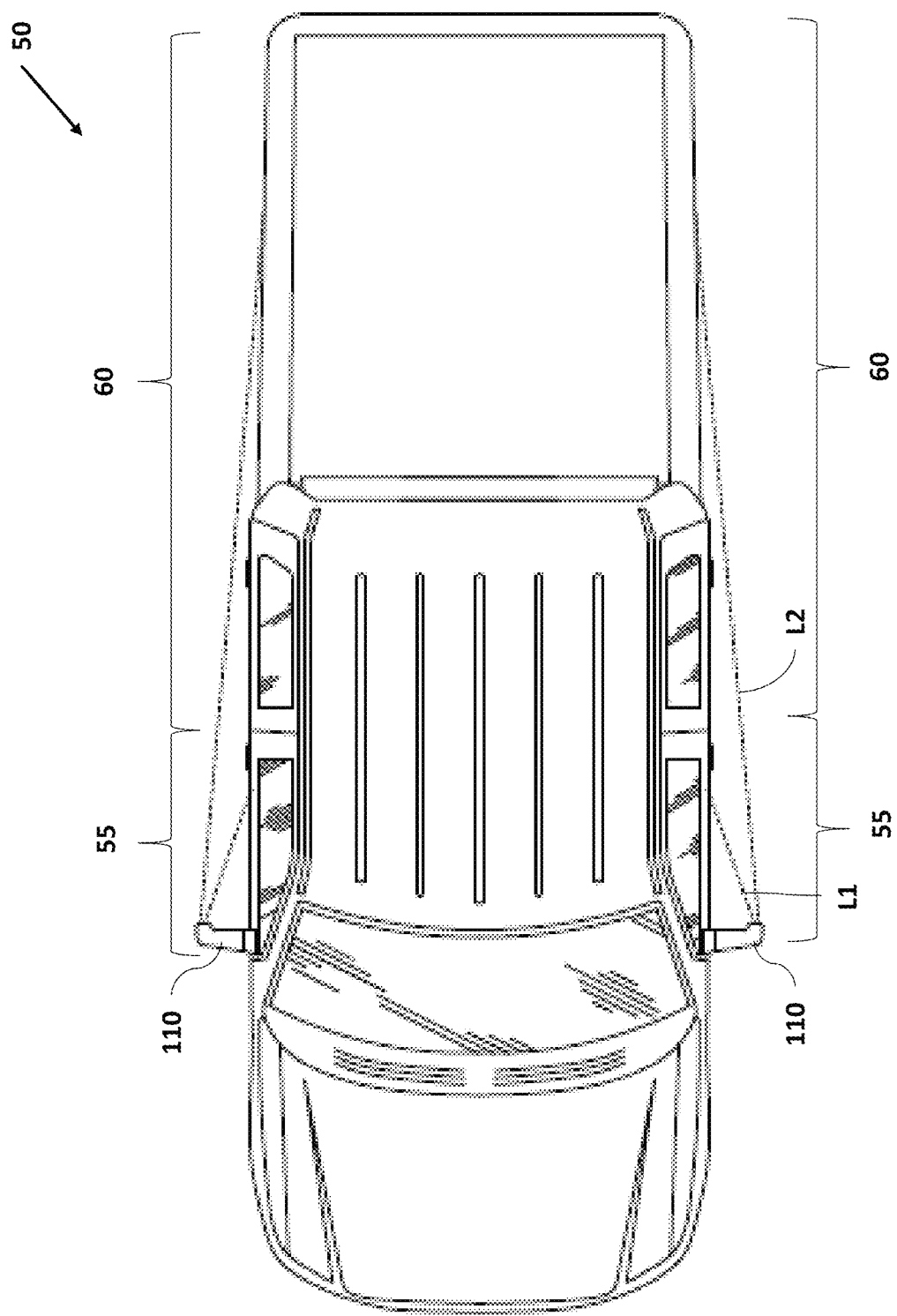
FIGS. 2e to 2h depict each the top of a vehicle with a rear view device of the rear view system being attached to the vehicle door and a ToF sensor being mounted, in different relative configurations of the rear view device and the vehicle door as well as the vehicle body.

In another embodiment illustrated in FIG. 2e, the first light signal L1 is pointed towards the door 55 of the vehicle 50 while the second light signal L2 is pointed towards the rear end of the body 60 post the door 55, on both sides of the vehicle 50 in driving direction. Both the light signals L1 and L2 return to the rear view device 110 within a predetermined duration-of-flight or time-of-flight as calibrate for the unfolded state of the rear view device 110 to determine that the state of the rear view device is in an unfolded state, with the rear view device 110 being attached to the door 55 of the vehicle 50. More particularly, if the time-of-flight of the first light signal L1 is within a first predefined time T1 and a second predefined time T2, and the time-of-flight of the second light signal L2 is within a third predefined time T3 and a fourth predefined time T4, the state of the rear view device 110 corresponds to the unfolded state. The first predefined time T1 and a second predefined time T2 are the time-of-flights of the first light signal L1 to travel back from the door 55 i.e. door start portion and door end portion when the rear view device 110 is in the unfolded state. The third predefined time T3 and the fourth predefined time T4 are the time-of-flights of the second light signal L2 to travel back from body 60 i.e. the body start portion and the body end portion when the rear view device 110 is in the unfolded state.

Figure 2F:
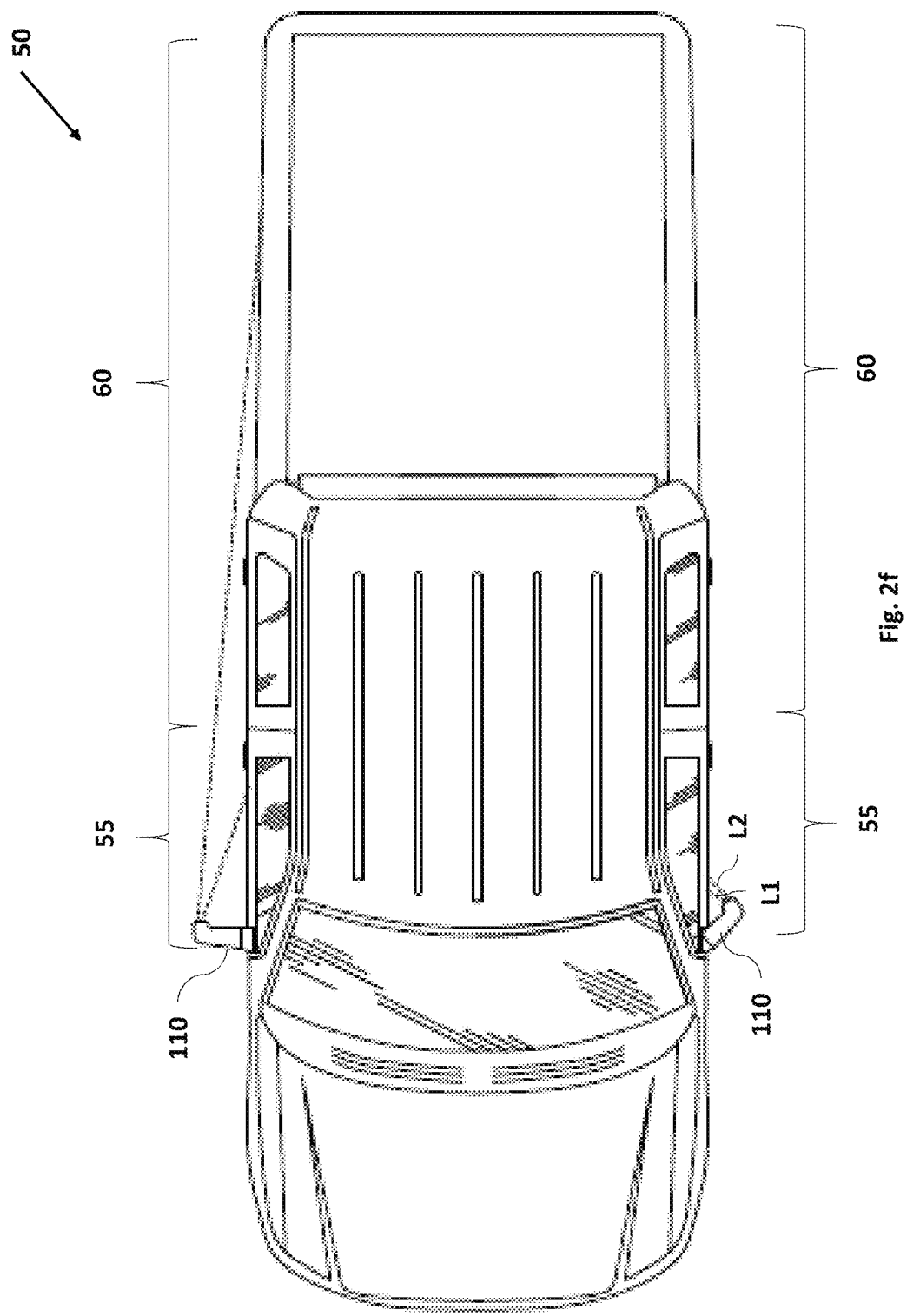

As illustrated in FIG. 2f, the first light signal L1 and the second light signal L2 on the left side of the vehicle 50 in driving direction are pointed towards the door 55 of the vehicle 50. Both the light signals L1 and L2, correspondingly, return to the rear view device 110 within a predetermined duration-of-flight or time-of-flight as calibrate for a folded state of the rear view device 110 to determine that the state of the rear view device 110 is in the folded state, with the rear view device 110 being attached to door 55 of the vehicle 50. More particularly, if the time-of-flight of the first light signal L1 is within a fifth predefined time T5 and a sixth predefined time T6, and the time-of-flight of the second light signal L2 is within a seventh predefined time T7 and an eighth predefined time T8, determining that the rear view device 110 is in the folded state. The fifth predefined time T5 and the sixth predefined time T6 are the time-of-flights of the first light signal L1 to travel back from the door 55, i.e. with a door start portion and a door end portion when the rear view device 110 is in the folded state. The seventh predefined time T7 and the eighth predefined time T8 are the time-of-flights of the second light signal L2 to travel back from door 55, i.e. with the door start portion and the door end portion when the rear view device 110 is in the folded state.

Figure 2G:
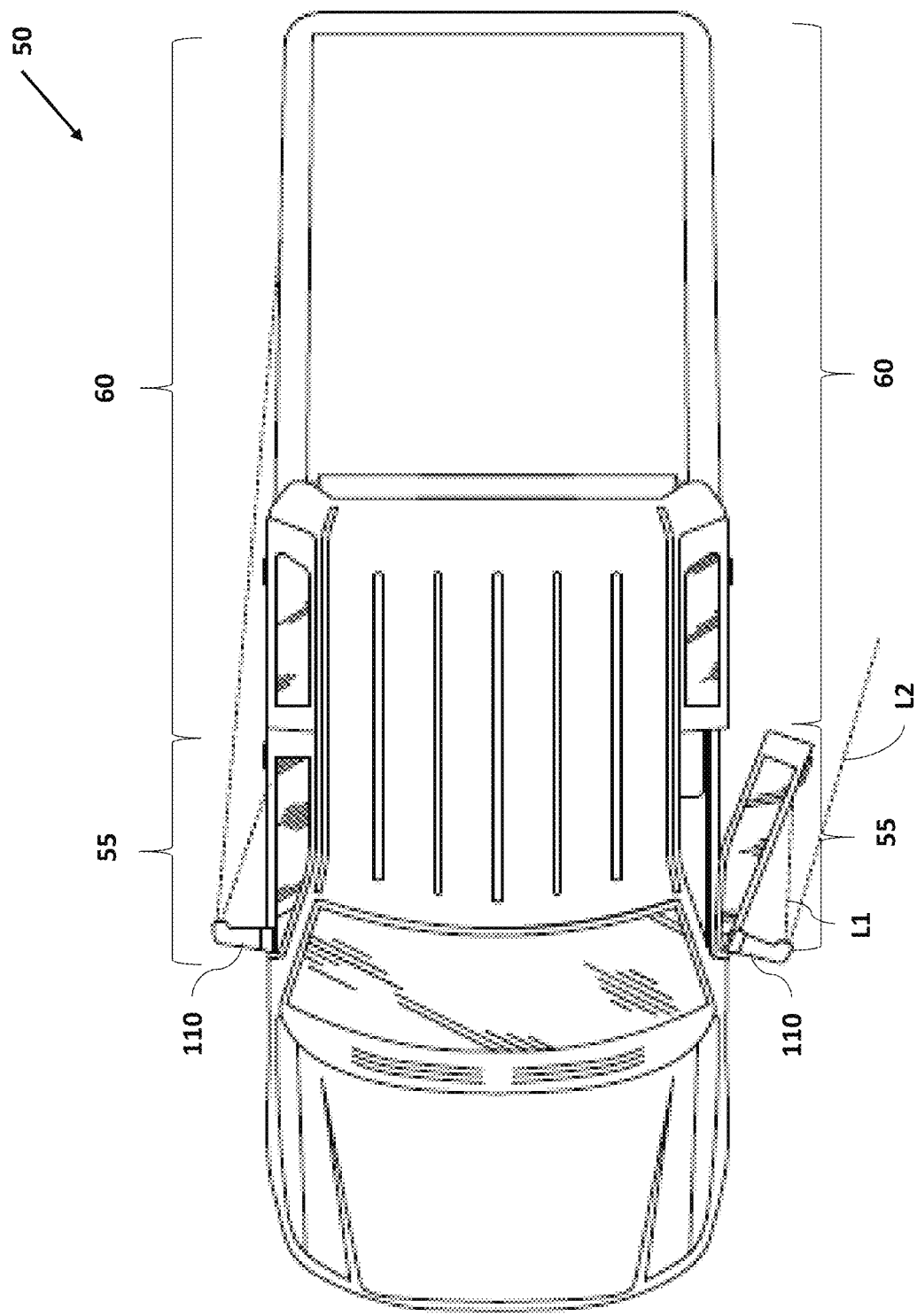

As illustrated in FIG. 2g, the first light signal L1 is pointed towards the door 55 of the vehicle 50 while the second light signal L2 is pointed towards the rear end of the body 60 post the door 55, on the left side of the vehicle 50 in driving direction. Both the light signals L1 and L2 return to the rear view device 110 within a predetermined duration-of-flight or time-of-flight as calibrate for the unfolded state of the rear view device 110 to determine that the state of the rear view device is in an unfolded state, with the rear view device 110 being attached to door 55 of the vehicle 50. More particularly, if the time-of-flight of the first light signal L1 is within a first predefined time T1 and a second predefined time T2, however, the time-of-flight of the second light signal L2 is more than a third predefined time T3 and a fourth predefined time T4, the state of the rear view device 110 corresponds to the unfolded state. It is further determined that the door 55 is in the open position since the second light signal L2 takes longer than the third predefined time T3 and the fourth predefined time T4. The first predefined time T1 and the second predefined time T2 are the time-of-flights of the first light signal L1 to travel back from the door 55, i.e. with a door start portion and a door end portion when the rear view device 110 is in the unfolded state. The third predefined time T3 and the fourth predefined time T4 are the time-of-flights of the second light signal L2 to travel back from body 60, i.e. with a body start portion and a body end portion when the rear view device 110 is in the unfolded state.

Figure 2H:
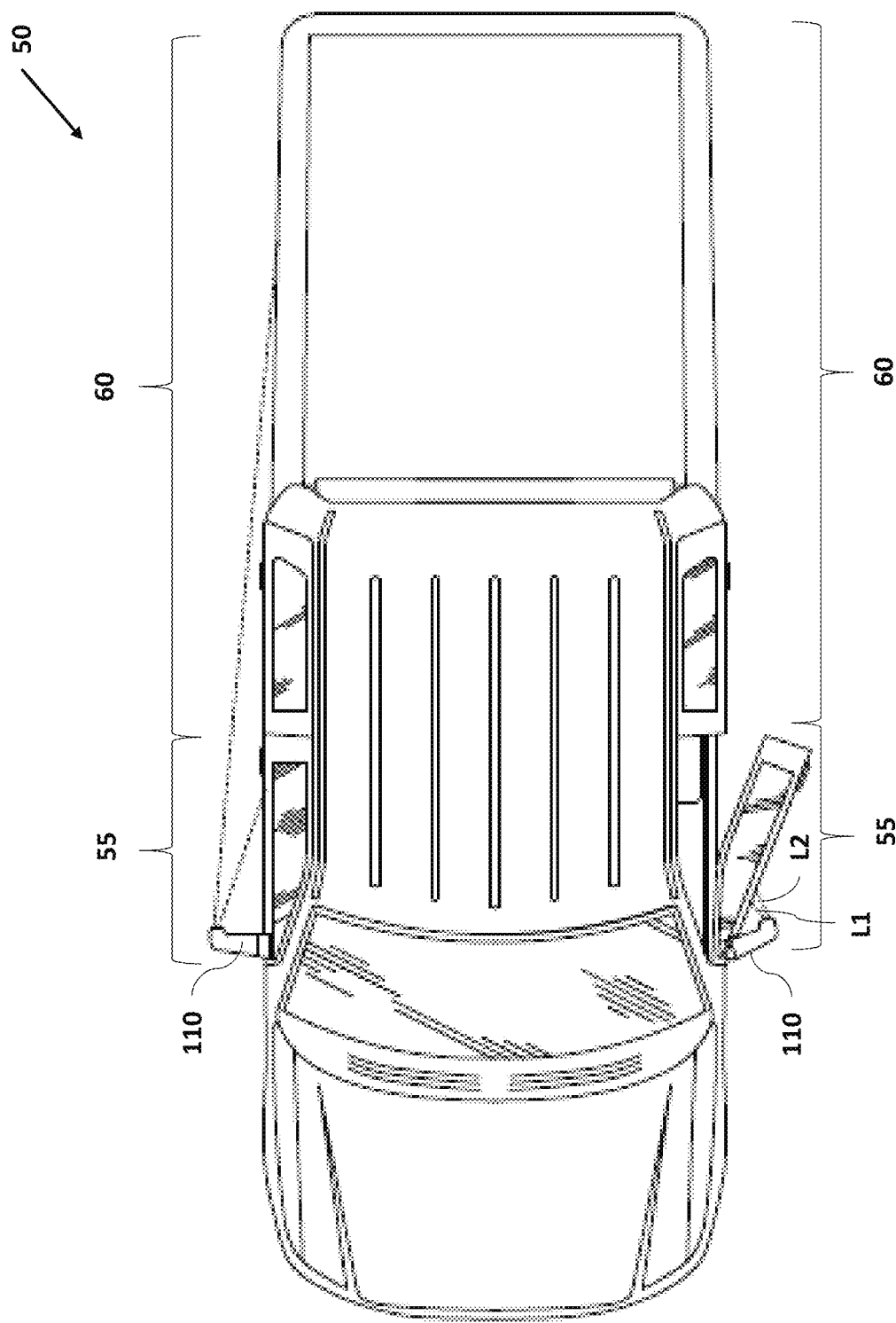

As illustrated in FIG. 2h, the first light signal L1 and the second light signal L2 are pointed towards the door 55 of the vehicle 50. Both the light signals L1 and L2 return to the rear view device 110 within a predetermined duration-of-flight or time-of-flight as calibrate for a folded state of the rear view device 110 to determine that the state of the rear view device 110 is in the folded state, with the rear view device 110 being attached to the door 55 of the vehicle 50. More particularly, if the time-of-flight of the first light signal L1 is within a fifth predefined time T5 and a sixth predefined time T6, and the time-of-flight of the second light signal L2 is within a seventh predefined time T7 and an eighth predefined time T8, meaning thereby that the rear view device 110 is in the folded state. The fifth predefined time T5 and the sixth predefined time T6 are the time-of-flights of the first light signal L1 to travel back from the door 55, i.e. with a door start portion and a door end portion when the rear view device 110 is in the folded state. The seventh predefined time T7 and the eighth predefined time T8 are the time-of-flights of the second light signal L2 to travel back from door 55, i.e. with a door start portion and the door end portion when the rear view device 110 is in the folded state.

Figure 2I:
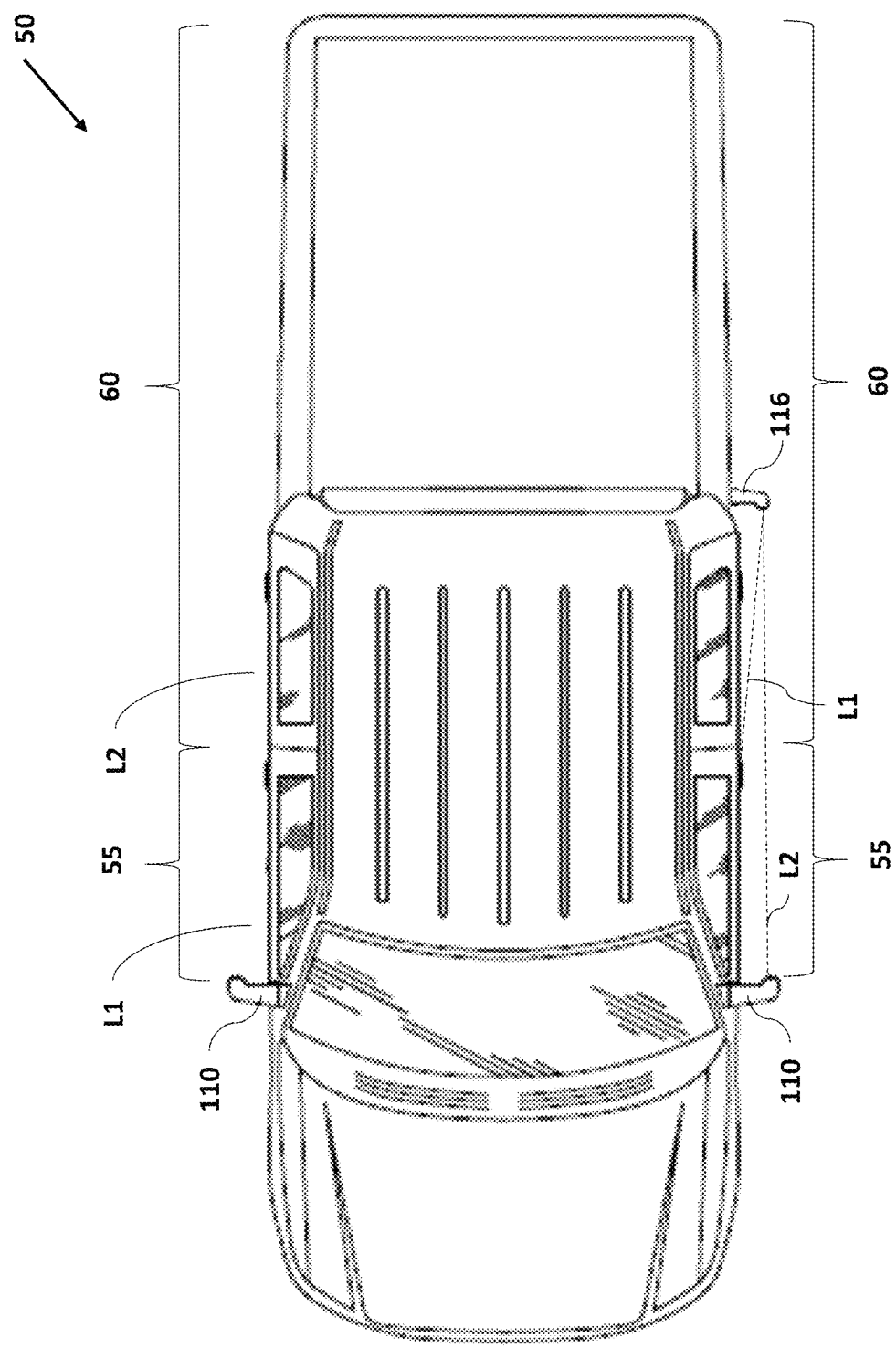
FIGS. 2i and 2j depict the top of a vehicle with a rear view device of the rear view system being attached to the vehicle body and a ToF sensor being mounted separate from the rear view device to a vehicle body, rearward and forward with respect to the rear view device, respectively.
Figure 2J:
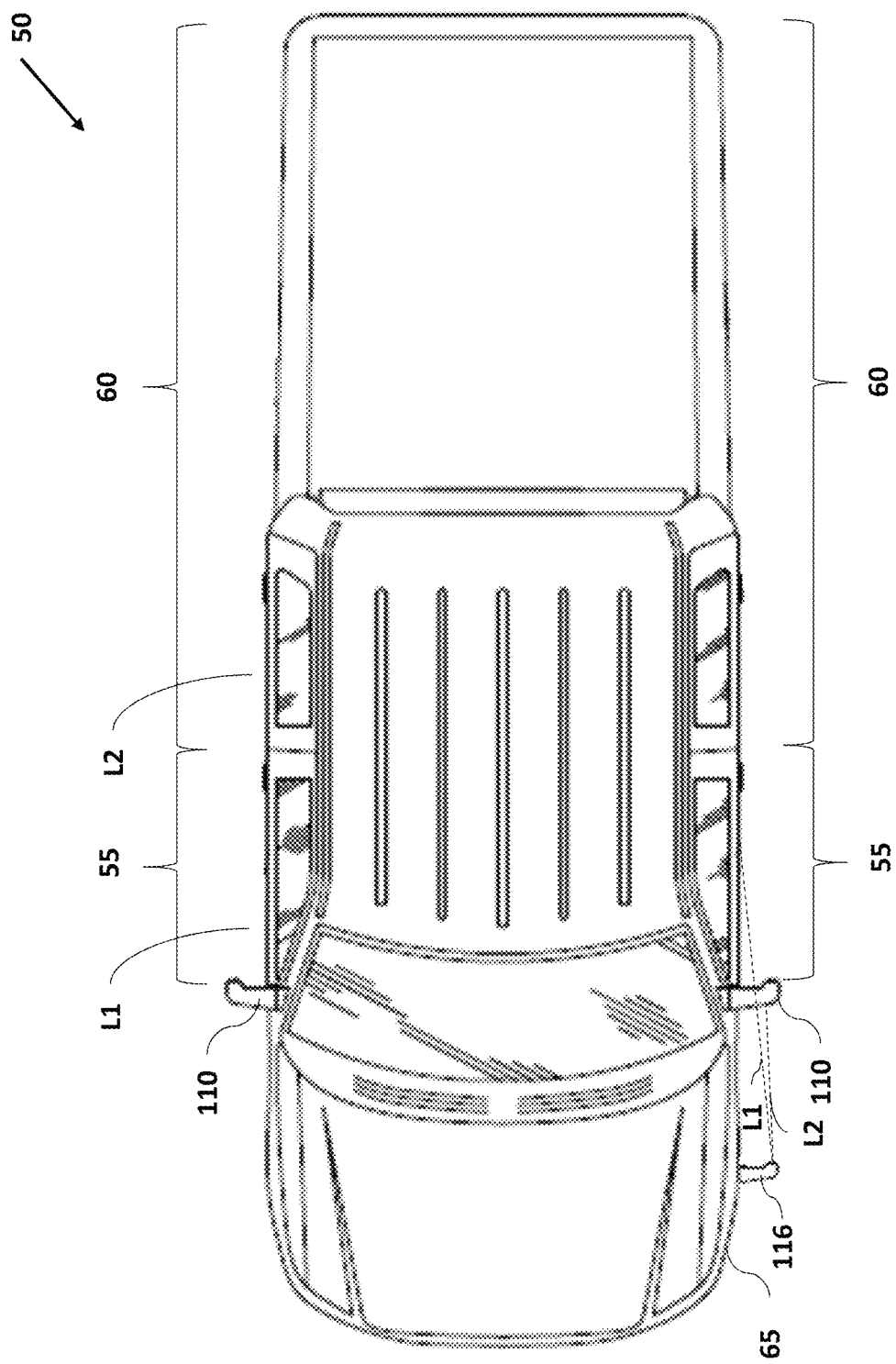

In further embodiments, as illustrated in FIGS. 2i and 2j, the rear view device 110 and the TOF sensor 116 are attached to the body 60 of the vehicle 50, with the TOF sensor 116 being located outside the rear view device 110 in line with FIG. 1b.

As illustrated in FIG. 2i, the TOF senor 116 is attached to the body 60 after the door 55 ends, within the FOV. A first light signal L1 and a second light signal L2 are pointed towards the door 55 and the rear view device 110, respectively, of the vehicle 50. Both the light signals L1 and L2, return to the TOF sensor 116 within a predetermined duration-of-flight or time-of-flight as calibrate for an unfolded state of the rear view device 110 to determine that the state of the rear view device 110 is in the unfolded state as calibrated. The determination of the folded or unfolded state of the rear view device 110 and/or whether the door is in its open position or closed position may be realized in analogy as described with respect to FIGS. 2*a* to 2*h*.

As illustrated in FIG. 2*j*, the TOF senor 116 is attached to the body 60 before the rear view device 110 towards the front of the vehicle. In a specific embodiment, the TOF sensor 116 may be attached to the fender 65 of the vehicle 50. The first light signal L1 and the second light signal L2 are pointed towards the door 55 and the rear view device 110, respectively. Both the light signals L1 and L2 return to the TOF sensor 116 within a predetermined duration-of-flight or time-of-flight as calibrate for an unfolded state of the rear view device 110 to determine that the state of the rear view device 110 is in the unfolded state as calibrated. The determination of the folded or unfolded state of the rear view device 110 and/or whether the door is in its open position or closed position may be realized in analogy as described with respect to FIGS. 2*a* to 2*h*.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. The features of the present disclosure in the foregoing description, in the drawings and in the claims can be essential both individually and in any combination for the implementation of the present disclosure in its various embodiments.

REFERENCE SIGNS

50 vehicle
55 door of the vehicle
60 body of the vehicle
65 fender
100 rear view system
110 rear view device
112 camera Module
114 reflective Element
116 TOF sensor
120 processing unit
L1 first light signal
L2-second light signal
T1 first predefined time
T2 second predefined time
T3 third predefined time
T4 fourth predefined time
T5 fifth predefined time
T6 sixth predefined time
T7 seventh predefined time
T8 eighth predefined time

The invention claimed is:
1. A rear view system for a vehicle, comprising:
a rear view device comprising at least one camera module and/or at least one reflective element,
wherein the rear view device is configured:
(1) to be mounted on a door or a body of the vehicle in order to detect a field of view (FOV) in a scene at least around a rear part of the vehicle, and
(2) to be moved between at least two states in form of a folded-in state and an unfolded state relative to the door and/or to the body of the vehicle,
a time-of-flight (ToF) sensor for emitting at least one light signal, and
a processing unit for determining at least one of the at least two states of the rear view device when the rear view device is mounted on the vehicle,
wherein the ToF sensor is adapted to be mounted either
(1) on the rear view device, or
(2) on the vehicle, separate from the rear view device,
wherein the processing unit is configured
(1) to actuate the ToF sensor to emit the at least one light signal either
(a) in a direction of the FoV of the rear view device if the ToF sensor is mounted on the rear view device, or
(b) in a direction of the rear view device if the ToF sensor is mounted separately from the rear view device, and
(2) to determine the at least one state of the rear view device based on the at least one light signal, and
wherein either
(i) the at least one light signal comprises
a first light signal in the direction of the door, and
a second light signal in the direction of the body of the vehicle,
when
(a) the rear view device is mounted on the door or the body,
(b) the door is closed,
(c) the rear view device is in its unfolded state, and
(d) the ToF sensor is mounted on the rear view device, or
(ii) the at least one light signal comprises
a first light signal in the direction of the door and
a second light signal in the direction of the rear view device
when
(a) the ToF sensor is mounted separately from the rearview device on the door or on the body,
(b) the door is closed,
(c) the rear view device is mounted on the body, and
(d) the rear-view device is in its deployed state.
2. The rear view system according to claim 1, wherein the processing unit determines the at least one state of the rear view device based on the first light signal and the second light signal.
3. The rear view system of claim 1, wherein the processing unit is adapted to determine the state of the door, including a door open position and a door closed position, based on the propagation time of the at least one light signal.
4. The rear view system of claim 1, wherein the processing unit is adapted to generate a report of at least one event comprising timing information on the state of the rear view device and/or the door.
5. The rear view system of claim 1, wherein the processing unit determines that the rear-view device is in the unfolded state if the propagation time of the first light signal is at least a first predefined time, which lies between the first predefined time and a second predefined time, and/or the processing unit determines that the rear view device is in the folded-in state if the propagation time of the first light signal is shorter than the first predefined time.

6. The rear view system of claim 5, wherein the processing unit determines that the rear-view device is in the unfolded state, if the propagation time of the second light signal is at least a third predefined time or between the third predefined time and a fourth predefined time.

7. The rear view system of claim 6, wherein the first, second, third and/or fourth predefined time depends on the mounting position of the rear view device and the ToF sensor as well as on the position on the door, relative to the body and relative to each other.

8. A vehicle comprising at least one rear view system according to claim 1.

* * * * *